C. IRWIN.
CLAMP.
APPLICATION FILED MAR. 20, 1918.

1,301,702. Patented Apr. 22, 1919.

Inventor
Charles Irwin.

Witnesses

Wm R. Smith

By Victor J. Evans
Attorney

UNITED STATES PATENT OFFICE.

CHARLES IRWIN, OF JEANNETTE, PENNSYLVANIA.

CLAMP.

1,301,702.

Specification of Letters Patent.

Patented Apr. 22, 1919.

Application filed March 20, 1918. Serial No. 223,663.

*To all whom it may concern:*

Be it known that I, CHARLES IRWIN, a citizen of the United States, residing at Jeannette, in the county of Westmoreland and State of Pennsylvania, have invented new and useful Improvements in Clamps, of which the following is a specification.

This invention relates to a clamp and has for its primary object to provide a clamp that may be readily associated with a boring machine table so as to clamp work thereon in a more accurate manner than is the usual practice where clamping bolts are used.

An object of the invention is to provide substantial elements substantially connected together so as to stand rough usage to which a device of this character is subject.

A feature of my invention is the novel manner of forming the arm so that the same may be capable of engaging two sides of an object.

With these and other objects in view the invention will be better understood from the following detailed description taken in connection with the accompanying drawing wherein:

Fig. 3 is a detailed view showing the use of a clip so that one of the clamping devices may be dispensed with.

In a diagrammatic manner I show a portion of the boring machine table "A" upon which is mounted a cap "B" that is to be bored. Connected to the table at the proper points are a pair of brackets 1 and 2 but I wish it to be understood at this point that any suitable number of clamping devices may be used depending upon the shape of the object to be clamped. As both of the clamps are of identical construction the following description will be limited to one.

Figure 1:
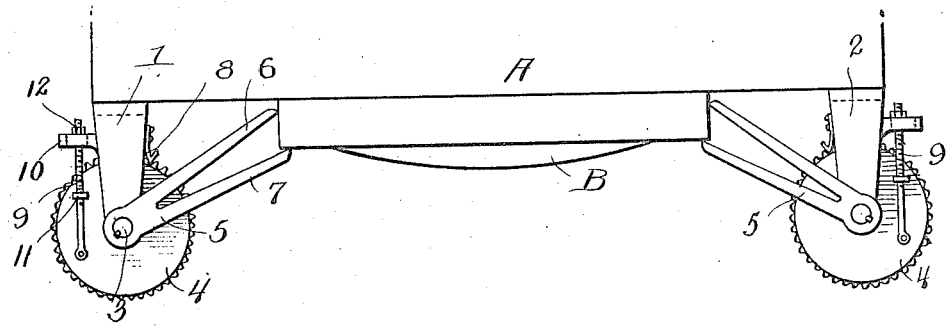
Figure 1 is a view showing my invention in applied position.

The bracket 1 has mounted therein a shaft 3 to which is rigidly connected a wheel 4 in the form of a ratchet wheel. This shaft 3 also has rigidly connected thereto one end of a bifurcated arm 5, the limbs 6 and 7 being of such a shape and length as to engage two sides of the cap as clearly shown in Fig. 1 of the drawing. Coöperating with the teeth of the ratchet wheel is a leaf spring 8 of the required strength to hold the arm 5 in an operative position. Although I show the leaf spring as the braking element I wish it to be understood that I do not desire to be limited to the exact showing as other suitable forms of braking elements may be used, the sole purpose being to hold the ratchet wheel against turning accidentally when the arm 5 is in applied position but allowing the arm and wheel to turn when excessive force is brought to bear by the operator upon the arm 5 for returning the arm to an inoperative position.

Pivotally connected to the wheel is a rod 9 that passes through an apertured ear 10 formed integral with the bracket. The upward movement of the rod 9 is limited by a collar 11 while a nut 12 threaded on the rod limits the downward movement of the rod. The advantage of this latter construction is that the rotation of the ratchet wheel is limited so as to prevent the arm 5 from moving too far out of its operative position.

Figure 3:
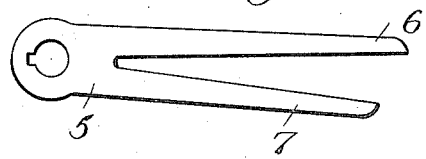
Figure 2:
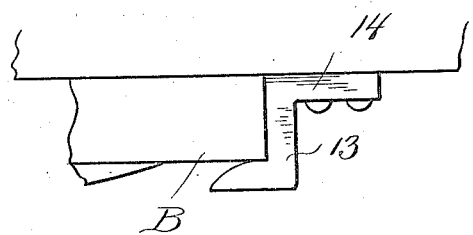
Fig. 2 is a perspective view of the arm.

If found advantageous in practice all clamping devices may be dispensed with, with the exception of one, and clips 13 shown in Fig. 3 substituted. These clips are of Z shape formation with one limb 14 secured to the table and the remaining portion respectively embracing two sides of the cap "B".

From the foregoing description taken in connection with the accompanying drawing it should be apparent that I provide a simple device of substantial construction that is capable of quickly supporting an object upon the table and effectively holding the same against movement during the boring operation.

Having described my invention what I claim is:

A clamp comprising a stationary bracket, a ratchet wheel supported for rotation thereby a bifurcated arm rigidly connected to the wheel so as to have arcuate movements, a brake element connected to the bracket and acting against the teeth of said ratchet wheel and a rod pivoted to the wheel and having a limited slidable connection with said bracket.

In testimony whereof I affix my signature.

CHARLES IRWIN.

Copies of this patent may be obtained for five cents each, by addressing the "Commissioner of Patents, Washington, D. C."